US 12,494,685 B2

United States Patent
Fatemi et al.

(10) Patent No.: US 12,494,685 B2
(45) Date of Patent: Dec. 9, 2025

(54) AXIAL FLUX ELECTRIC MACHINE ROTOR WITH CONTINUOUS HALBACH ARRAY MAGNETS

(71) Applicant: GM GLOBAL TECHNOLOGY OPERATIONS LLC, Detroit, MI (US)

(72) Inventors: Alireza Fatemi, Canton, MI (US); Thomas W. Nehl, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 242 days.

(21) Appl. No.: 18/512,663

(22) Filed: Nov. 17, 2023

(65) Prior Publication Data

US 2025/0167611 A1  May 22, 2025

(51) Int. Cl.
*H02K 1/2793* (2022.01)
*H02K 16/02* (2006.01)

(52) U.S. Cl.
CPC .......... *H02K 1/2793* (2013.01); *H02K 16/02* (2013.01); *H02K 2211/03* (2013.01)

(58) Field of Classification Search
CPC ...... H02K 1/2793; H02K 16/00; H02K 16/02; H02K 2211/03; H02K 1/2796; H02K 1/2786; H02K 1/2792
See application file for complete search history.

(56) References Cited

U.S. PATENT DOCUMENTS

2007/0035192 A1* 2/2007 Jeon ..................... H02K 1/2791
    310/156.43
2018/0351441 A1* 12/2018 Milheim ................ H02K 23/54

FOREIGN PATENT DOCUMENTS

| CN | 114744844 A | * | 7/2022 | ............. H02K 1/182 |
| CN | 114915070 A |   | 8/2022 | |
| CN | 115313718 A | * | 11/2022 | ........... H02K 1/2798 |
| DE | 112016003201 T5 |   | 4/2018 | |
| WO | WO-2021226293 A2 | * | 11/2021 | ............. H02K 1/278 |

OTHER PUBLICATIONS

Machine Translation of CN 115313718 A (Year: 2022).*
Text Version of WO 2021226293 A2 (Year: 2021).*
Machine Translation of CN 114744844 A (Year: 2022).*

* cited by examiner

*Primary Examiner* — Alexander A Singh
*Assistant Examiner* — Charlie Frank Mann, Jr.
(74) *Attorney, Agent, or Firm* — Quinn IP Law

(57) ABSTRACT

A rotor for rotatably mounting on a rotational axis in an axial flux electric motor includes a permanent magnet (PM) disc having a continuous Halbach magnetization profile. The axial flux electric motor also includes a rotationally fixed stator having a plurality of conductive stator magnetic poles arranged radially about the rotational axis. The rotor is spaced axially from one side of the stator. A motor vehicle employing the subject axial flux electric motor is also contemplated.

20 Claims, 4 Drawing Sheets

AXIAL FLUX ELECTRIC MACHINE ROTOR WITH CONTINUOUS HALBACH ARRAY MAGNETS

INTRODUCTION

The disclosure relates to a rotor with continuous Halbach array magnets for an axial flux electric machine.

An electric motor is a machine that converts electric energy into mechanical energy. An electric motor's operation is based on an electromagnetic interaction between permanent magnets and the magnetic field created by the machine's selectively energized coils. Electric motors are classified into two categories based on the direction of the magnetic field—axial flux motors and radial flux motors. Arrangement of the gap between the machine's rotor and stator, positioned parallel to the axis of rotation in an axial flux motor and radially in the radial flux motor, determines the direction of the motor's magnetic flux.

Axial and radial flux motors may be configured as switched reluctance machines. Generally, a reluctance machine induces non-permanent magnetic poles on the ferromagnetic rotor. The rotor of such a machine normally does not have windings and generates torque through magnetic reluctance. Reluctance machine subtypes include synchronous, variable, switched and variable stepping motors. Reluctance motors can deliver high power density but may experience significant high load torque undulation or "torque ripple" (difference between maximum and minimum torque during one revolution) from the reluctance, if it is combined with torque from magnets, which may also generate noise.

Typically, axial flux motors have a comparatively denser and shorter flux flow path. Additionally, rotor magnets may be located further away from the axial motor's central rotating axis as compared to radial flux motors. As a result, axial flux motors generally have a higher torque-to-weight and torque-to-size ratio versus radial flux motors when the diameter of the rotor is substantially larger than its axial length. The magnets on the rotor of an axial flux motor, like all forms of AC synchronous electric motors, are attracted to the spinning field generated by a surrounding ring of independent electromagnets in the stator. Because the switching of the magnets that causes the field to revolve is typically not perfectly smooth, the rotor suffers from a torque ripple.

SUMMARY

An axial flux electric motor includes a rotationally fixed stator defining a rotational axis and having a plurality of conductive stator magnetic poles arranged radially about the rotational axis. The axial flux electric motor also includes a first rotor spaced axially from one side of the stator, rotatably mounted coaxially with the rotational axis. The first rotor is characterized by a first rotor exterior surface facing the stator and includes a first permanent magnet (PM) disc having a continuous (non-segmented) Halbach magnetization profile.

The axial flux electric motor may additionally include a second rotor spaced axially from another side from the stator, having a second rotor exterior surface facing the stator, and rotatably mounted coaxially with the rotational axis. The second rotor may include a second PM disc having the continuous Halbach magnetization profile.

The continuous Halbach magnetization profile of each of the first PM disc and the second PM disc may have a cyclical pattern.

The cyclical pattern of the first PM disc may be phase-angle aligned with the cyclical pattern of the second PM disc.

The cyclical pattern of the first PM disc may be phase-angle shifted relative to the cyclical pattern of the second PM disc.

Each of the first PM disc and the second PM disc may include a plurality of concentrically arranged rings. Each subject ring may have the continuous Halbach magnetization profile.

The first rotor may additionally include a first support structure and the second rotor may similarly include a second support structure. In such an embodiment, each of the plurality of concentrically arranged rings of the first and second PM discs may be mounted to the respective first and second support structure.

Each of the first PM disc and the second PM disc may include a spirally formed structure having the continuous Halbach magnetization profile.

The stator may be characterized by a printed circuit board (PCB) structure defining the stator's magnetic poles.

The stator may be characterized by a slotless structure defining the stator's magnetic poles.

A motor vehicle employing such an axial flux electric motor is also contemplated.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
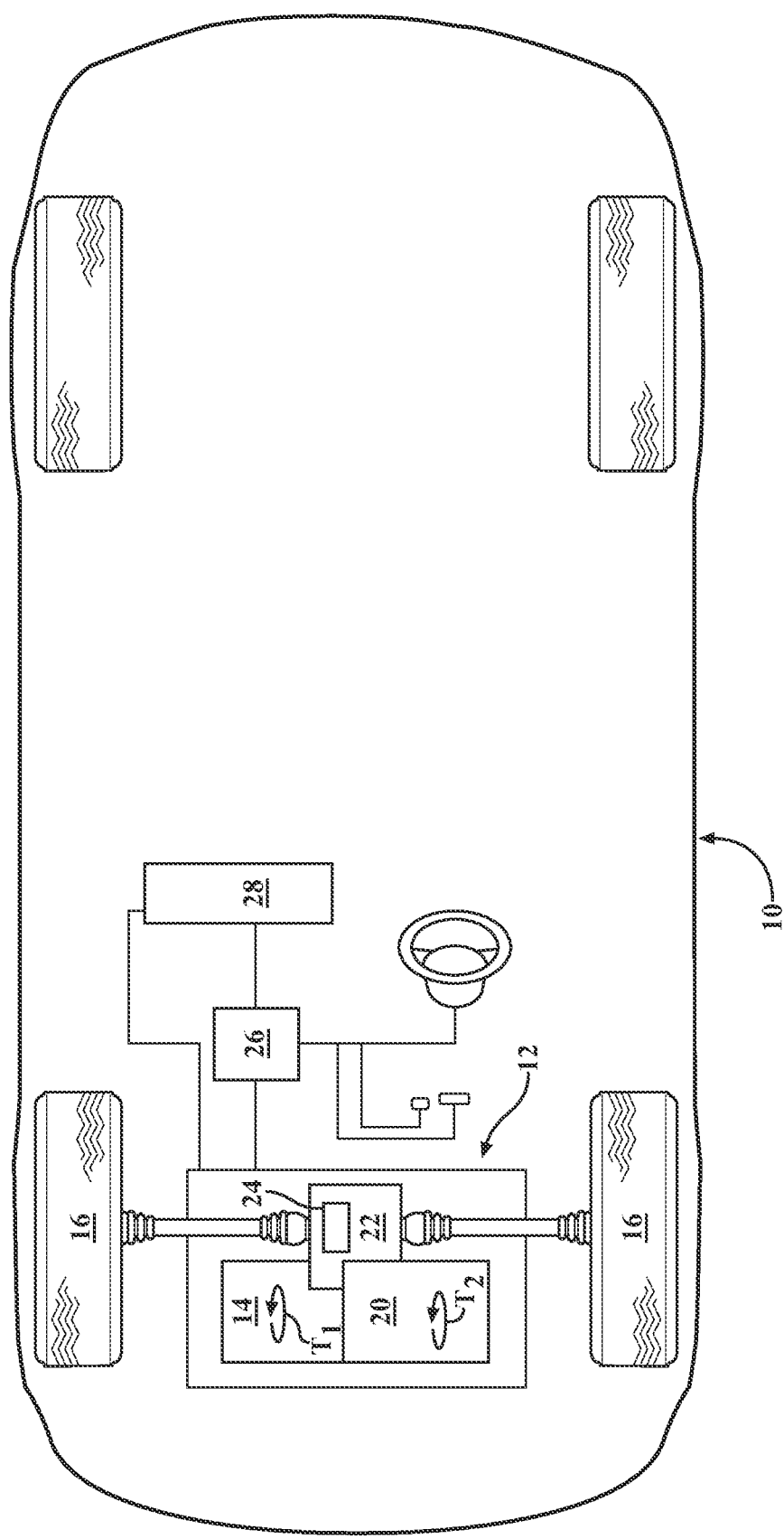
FIG. 1 is a schematic illustration of a motor vehicle having a powertrain employing an axial flux electric motor-generator for propulsion.

Embodiments of the present disclosure as described herein are intended to serve as examples. Other embodiments may take various and alternative forms. Additionally, the drawings are generally schematic and not necessarily to scale. Some features may be exaggerated or minimized to show details of particular components. Therefore, specific structural and functional details disclosed herein are not to be interpreted as limiting, but merely as a representative basis for teaching one skilled in the art to variously employ the present disclosure.

Certain terminology may be used in the following description for the purpose of reference, and thus are not intended to be limiting. For example, terms such as "above" and "below" refer to directions in the drawings to which reference is made. Terms such as "front", "back", "fore", "aft", "left", "right", "rear", and "side" describe the orientation and/or location of portions of the components or elements within a consistent but arbitrary frame of reference, which is made clear by reference to the text and the associated drawings describing the components or elements under discussion. Moreover, terms such as "first", "second", "third", and so on may be used to describe separate components. Such terminology may include the words specifically mentioned above, derivatives thereof, and words of similar import.

Referring to FIG. 1, a motor vehicle 10 having a powertrain 12 is depicted. The vehicle 10 may include, but not be limited to, a commercial vehicle, industrial vehicle, passenger vehicle, aircraft, watercraft, train or the like. It is also contemplated that the vehicle 10 may be a mobile platform, such as an airplane, all-terrain vehicle (ATV), boat, personal movement apparatus, robot and the like to accomplish the purposes of this disclosure. The powertrain 12 includes a first power-source 14 depicted as an electric motor-generator and configured to generate a first power-source torque T1 (shown in FIG. 1) for propulsion of the vehicle 10 via driven wheels 16, such as relative to a road surface. The motor-generator 14 is configured as a reluctance machine in which non-permanent magnetic poles are induced on the motor's ferromagnetic rotor(s) to be described in detail below.

As shown in FIG. 1, the powertrain 12 may also include a second power-source 20, such as an internal combustion engine configured to generate a second power-source torque T2. The power-sources 14 and 20 may act in concert to power the vehicle 10 and be operatively connected to a transmission assembly 22. The transmission assembly 22 may be configured to transmit first and/or second power-source torques T1, T2 to a final drive unit 24, which in turn may be connected to the driven wheels 16. The first power-source 14, which for the remainder of the present disclosure will be referred to as a motor-generator, may, for example, be mounted to the second power-source 20, mounted to (or incorporated into) the transmission assembly 22, mounted to the final drive unit 24, or be a stand-alone assembly mounted to the structure of the vehicle 10. Alternatively, a respective first power-source 14 may be incorporated into each driven wheel 16 as an in-wheel/hub motor. As shown, the vehicle 10 additionally includes a programmable electronic controller 26 configured to control the powertrain 12 to generate a predetermined amount of power-source torque T, and various other vehicle systems. The vehicle 10 additionally includes an energy storage system 28, such as one or more batteries, configured to generate and store electrical energy for powering the power-sources 14 and 20.

Figure 2:
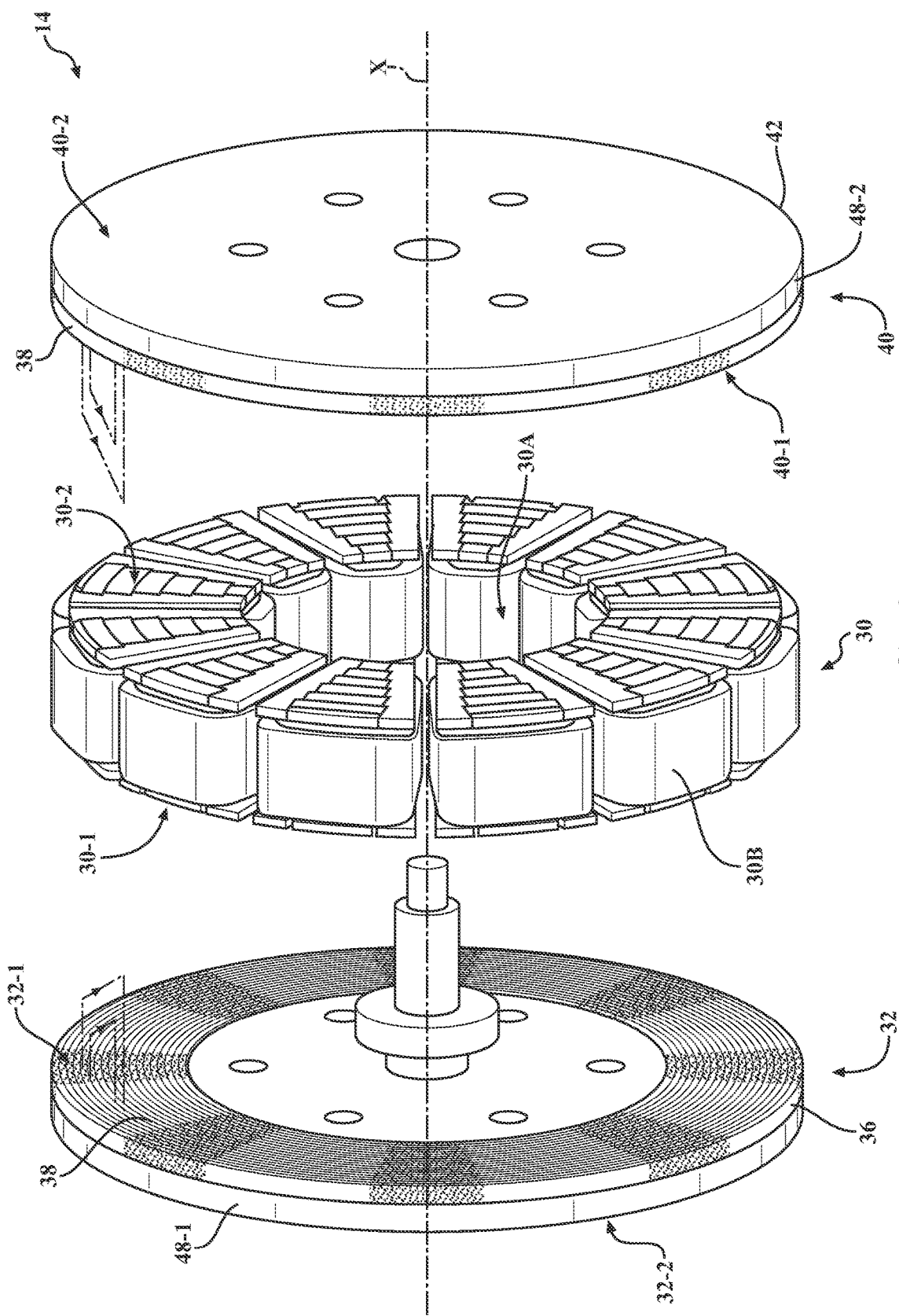
FIG. 2 is a schematic, close-up, exploded partial perspective view of the motor-generator shown in FIG. 1, depicting a stator assembly with first and second rotors, each having a permanent magnet (PM) disc having a continuous Halbach magnetization profile, according to an embodiment of the disclosure.

As shown in FIG. 2, the motor-generator 14 includes a rotationally fixed stator 30. The stator 30 defines a rotational axis X and includes a stator core 30A and a plurality of magnetic poles 30B arranged radially about the rotational axis X. The stator 30 has two opposing sides—a first side 30-1 and a second side 30-2. The motor-generator 14 also includes a first rotor 32 spaced axially from the first side 30-1 of the stator 30 creating an operative airgap therebetween. The first rotor 32 is rotatably mounted coaxially with the rotational axis X and has a first rotor exterior side or surface 32-1 facing the stator 30 and an opposite rotor exterior side or surface 30-2. The first rotor 32 includes a first permanent magnet (PM) disc 36. As shown, the PM disc 36 has a continuous Halbach magnetization profile 38, wherein the term "continuous" specifically describes an uninterrupted or non-segmented structure having magnetic field vectors rotating in a repeating flow pattern along a circular path.

In general, a "Halbach array" is a particular arrangement of discrete permanent magnets providing a spatially rotating or alternating magnetic field vector that augments the magnetic field on one side of the array while cancelling the field to near zero on the other side. The net effect of the Halbach arrangement is a one-sided magnetic flux distributions roughly similar to many horseshoe magnets placed adjacent to each other, with similar poles touching. The most notable advantage of a Halbach array is generation of a significantly stronger magnetic field on one side of the array with a minimized stray field on the opposite side of the array.

The continuous Halbach magnetization profile 38 is a spatially rotating or alternating magnetic field vector that has the effect of focusing and augmenting the magnetic flux on the first rotor exterior surface 32-1, while cancelling it out on the opposite surface 32-2. As a result, the magnetic field produced by the continuous Halbach magnetization profile 38 is very strong on the first rotor exterior surface 32-1. Furthermore, thus produced magnetic field is substantially stronger relative to other rotor structures having an analogous amount of magnet alloy, for example having discrete, alternating south and north pole permanent magnets arranged on a ferromagnetic rotor core. The motor-generator 14 may additionally include a second rotor 40 rotatably mounted coaxially with the rotational axis X and spaced axially from the second side 30-2 of the stator 30. The second rotor 40 may be characterized by a second rotor exterior surface 40-1 facing the stator 30 and an opposite rotor exterior side or surface 40-2.

Figure 3:
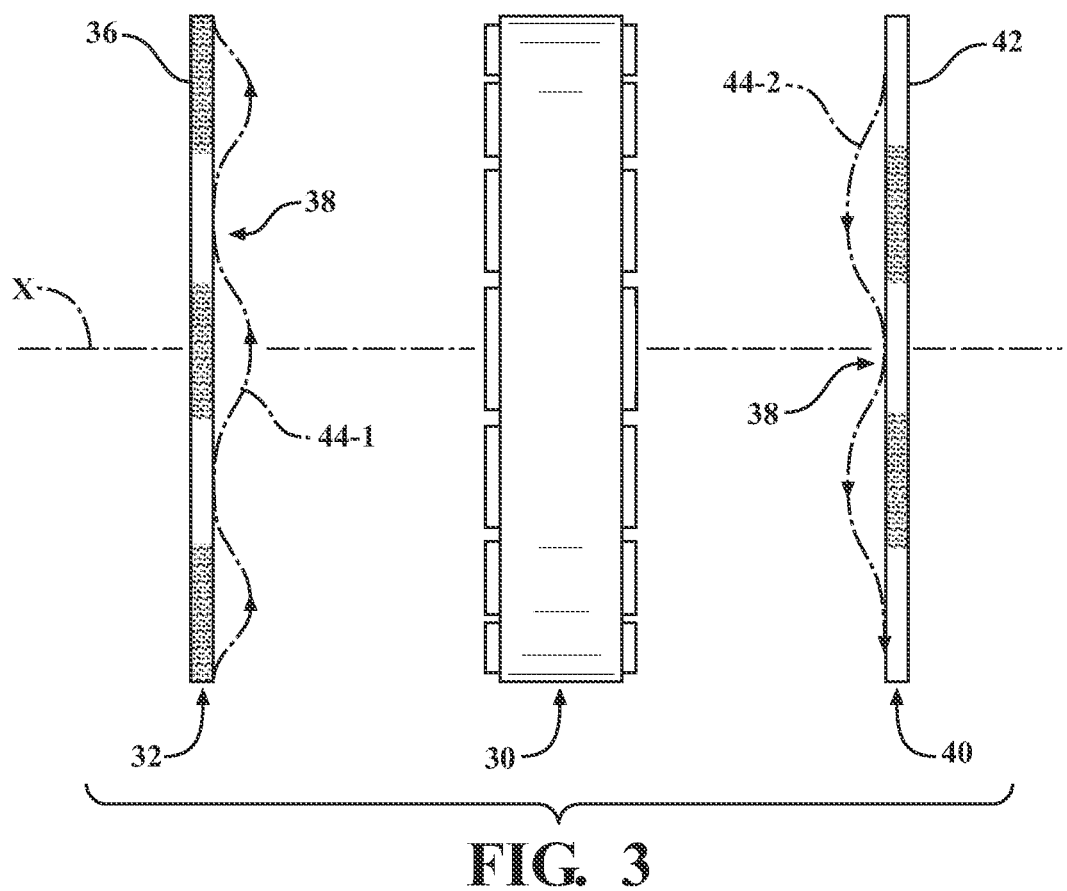
FIG. 3 is a schematic, close-up, partial side view of the motor-generator shown in FIG. 2, depicting a slotless embodiment of the stator structure and a phase-angle shift between the continuous Halbach magnetization profile of the first and second PM discs, according to the disclosure.
Figure 4:
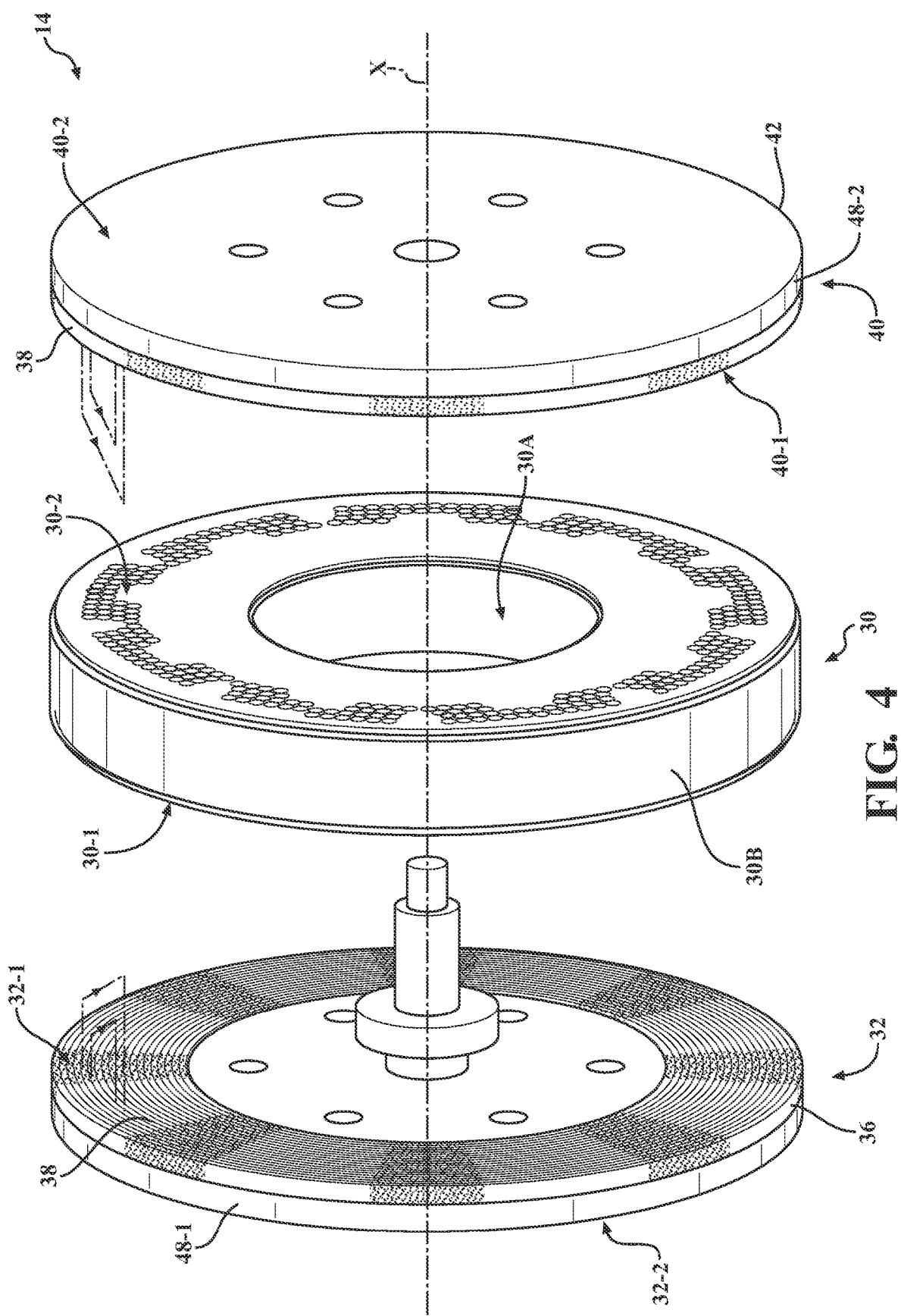
FIG. 4 is a schematic, close-up, exploded partial perspective view of the motor-generator shown in FIG. 2, depicting a printed circuit embodiment of the stator assembly magnetic poles, according to the disclosure.

As shown in FIG. 2, the second rotor 40 includes a second PM disc 42 having an analogous continuous Halbach magnetization profile 38. As shown in FIG. 3, the stator core 30A may be characterized by a slotless structure defining the stator magnetic poles 30B. Generally, slotted stators use a group of electrical steel laminations assembled to form a solid stack. The outer section of each lamination includes a ring of material from which a pattern of teeth is arranged radially and project toward the rotor. Electromagnetic coils are then wound around the teeth or inserted into each slot between the teeth (as may be seen in FIG. 2). The laminated stack and wound copper coil form the stator assembly. Slotless stators typically enhance electric motor smoothness, generate predictable motor torque output with minimal non-linear effects, as well as reduced noise and vibration via low cogging, enabling cooler and smoother operation and higher speeds. Such slotless stators work advantageously with sinusoidal drivers, such as the PM discs 36, 42 with the continuous Halbach magnetization profile 38, to generate reduced torque ripple and negligible distortion in output torque. Alternatively, as shown in FIG. 4, the magnetic poles 30B of the stator 30 may be defined by a printed circuit board (PCB) structure. In PCB stators, copper windings found in conventional stators are replaced stators with an ultra-thin printed circuit board that positions copper conductors in particularly needed places. The PCB stator structure results in a higher efficiency machine that uses a fraction of the copper required by a conventional motor.

The continuous Halbach magnetization profile 38 may extend around the circumference of the respective rotor 32, 40, such that the first PM disc 36 has a cyclical or sinusoidal pattern 44-1 and the second PM disc 42 has a respective cyclical pattern 44-2. Each of the first and second rotors 32, 40 having the respective PM discs 36, 42 may be characterized by an absence of a ferromagnetic rotor core. As installed in the motor-generator 14, the cyclical pattern 44-1 of the first PM disc 36 may be phase-angle aligned with the cyclical pattern 44-2 of the second PM disc 42 (shown in FIGS. 2 and 4). Alternatively, the cyclical pattern 44-1 of the first PM disc 36 may be rotated or phase-angle shifted relative to the cyclical pattern 44-2 of the second PM disc 42, as shown in FIG. 3.

For example, shown in FIG. 3, the first and second rotors 32, 40 may be generally identical, where the PM disc 36 is a substantial duplicate of the PM disc 42. The phase-angle shift between respective PM discs 36, 42 would position the cyclical pattern 44-1 out of alignment relative to the cyclical pattern 44-2. Such a phase-angle shift of the cyclical pattern 44-1 relative to the cyclical pattern 44-2 may be employed to reduce cogging torque between the two PM discs 36, 42 and the stator 30 and alter the magnetic reluctance of the electric motor 14. Magnetic reluctance is generally defined as the ratio of magnetomotive force (mmf) to magnetic flux, representing the opposition to magnetic flux, and generally depends on the geometry and composition of an object. Two rotor disks 36, 42 having poles either with identical or with opposite magnetic polarities may be envisioned. With identical polarities, two back-to-back stators 30 sharing a common back iron would be employed. With opposite polarities, one common stator disk 30 may be used for and between the two rotor disks 36, 42.

Figure 5:
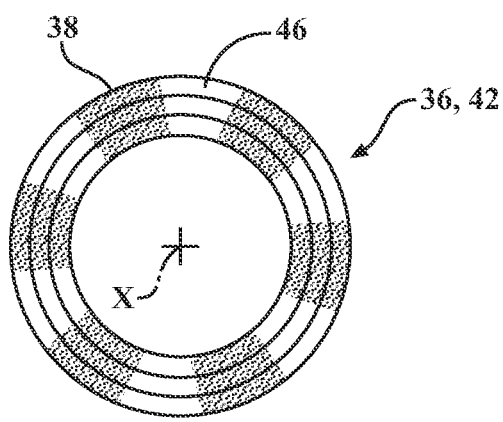
FIG. 5 is a schematic partial front view of a representative motor-generator rotor, depicting a concentric ring structure of the PM disc, according to an embodiment of the disclosure.
Figure 6:
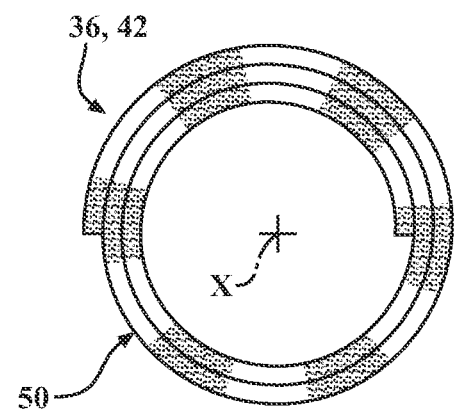
FIG. 6 is a schematic partial front view of a representative motor-generator rotor, depicting a spirally formed ring structure of the PM disc, according to an embodiment of the disclosure.

As shown in FIG. 5, each of the first and second PM discs 36, 42 may include a plurality of concentrically arranged rings 46. In such an embodiment, each subject ring 46 may have the continuous Halbach magnetization profile 38. As shown in FIG. 2, the first rotor 32 may additionally include a first support structure 48-1, while the second rotor 40 may include a second support structure 48-2. The first and second support structures 48-1, 48-2 may be employed for mounting concentric rings 46 of the respective PM discs 36, 42 shown in FIG. 5. The respective first and second support structures 48-1, 48-2 may be constructed from ferrous materials such as silicon steel, or non-ferrous materials such as aluminum or a polymer. Alternatively, as shown in FIG. 6, each of the first PM disc 36 and the second PM disc 42 may include a spirally formed, in the radial direction, structure 50 having the continuous Halbach magnetization profile 38.

In summary, continuous Halbach magnetization profile 38 of PM discs 36, 42 provides an electric motor rotor with an alternating or cyclical magnetization field pattern that rotates relative to the stator. Such spatially rotating magnetic field focuses and augments the magnetic field on the rotor surface facing the stator. The net effect of the PM discs' continuous Halbach magnetization profile is a stronger magnetic field and motor output torque as compared to rotor structures using alternating south and north pole permanent magnets arranged on a ferromagnetic rotor core. The electric motor may also use specific stator configurations to complement the above characteristics of PM disc(s) 36, 42 and further enhance effectiveness of the continuous Halbach magnetization profile and operation of the motor.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings, or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. An axial flux electric motor comprising:
    a rotationally fixed stator defining a rotational axis and having a plurality of conductive stator magnetic poles arranged radially about the rotational axis; and
    a first rotor spaced axially from one side of the stator, rotatably mounted coaxially with the rotational axis, characterized by a first rotor exterior surface facing the stator, and including a first permanent magnet (PM) disc having a continuous Halbach magnetization profile.

2. The axial flux electric motor according to claim 1, further comprising a second rotor spaced axially from another side from the stator, characterized by a second rotor exterior surface facing the stator, and rotatably mounted coaxially with the rotational axis, and including a second PM disc having the continuous Halbach magnetization profile.

3. The axial flux electric motor according to claim 2, wherein the continuous Halbach magnetization profile of each of the first PM disc and the second PM disc has a cyclical pattern.

4. The axial flux electric motor according to claim 3, wherein the cyclical pattern of the first PM disc is phase-angle aligned with the cyclical pattern of the second PM disc.

5. The axial flux electric motor according to claim 3, wherein the cyclical pattern of the first PM disc is phase-angle shifted relative to the cyclical pattern of the second PM disc.

6. The axial flux electric motor according to claim 2, wherein each of the first PM disc and the second PM disc includes a plurality of concentrically arranged rings, and wherein each ring has the continuous Halbach magnetization profile.

7. The axial flux electric motor according to claim 6, wherein the first rotor additionally includes a first support structure, and the second rotor additionally includes a second support structure, and wherein each of the plurality of concentrically arranged rings of the first and second PM discs is mounted to the respective first and second support structure.

8. The axial flux electric motor according to claim 2, wherein each of the first PM disc and the second PM disc includes a spirally formed structure having the continuous Halbach magnetization profile.

9. The axial flux electric motor according to claim 1, wherein the stator is characterized by a printed circuit board (PCB) structure defining the stator magnetic poles.

10. The axial flux electric motor according to claim 1, wherein the stator is characterized by a slotless structure defining the stator magnetic poles.

11. A rotor for mounting on a rotational axis in an axial flux electric motor, comprising:
a permanent magnet (PM) disc having a continuous Halbach magnetization profile.

12. The rotor according to claim 11, wherein the continuous Halbach magnetization profile has a cyclical pattern.

13. The rotor according to claim 11, wherein the PM disc includes a plurality of concentrically arranged rings, and wherein each ring has the continuous Halbach magnetization profile.

14. The rotor according to claim 13, further comprising a support structure, and wherein the plurality of concentrically arranged rings of the PM disc is mounted to the support structure.

15. The rotor according to claim 11, wherein the PM disc includes a spirally formed structure having the continuous Halbach magnetization profile.

16. A motor vehicle comprising:
an axial flux electric motor configured to generate torque for propulsion of the motor vehicle, the axial flux electric motor including:
a rotationally fixed stator defining a rotational axis and having a plurality of conductive stator magnetic poles arranged radially about the rotational axis;
a first rotor spaced axially from one side of the stator, rotatably mounted coaxially with the rotational axis, characterized by a first rotor exterior surface facing the stator, and including a first permanent magnet (PM) disc having a continuous Halbach magnetization profile; and
a second rotor spaced axially from another side of the stator, characterized by a second rotor exterior surface facing the stator, and rotatably mounted coaxially with the rotational axis, and including a second PM disc having the continuous Halbach magnetization profile;
wherein the continuous Halbach magnetization profile of each of the first PM disc and the second PM disc has a cyclical pattern.

17. The motor vehicle according to claim 16, wherein the cyclical pattern of the first PM disc is phase-angle aligned with the cyclical pattern of the second PM disc.

18. The motor vehicle according to claim 16, wherein the cyclical pattern of the first PM disc is phase-angle shifted relative to the cyclical pattern of the second PM disc.

19. The motor vehicle according to claim 16, wherein each of the first PM disc and the second PM disc includes a plurality of concentrically arranged rings, and wherein each ring has the continuous Halbach magnetization profile.

20. The motor vehicle according to claim 16, wherein each of the first PM disc and the second PM disc includes a spirally formed structure having the continuous Halbach magnetization profile.

* * * * *